United States Patent
Nishikawa et al.

(10) Patent No.: US 9,834,079 B2
(45) Date of Patent: Dec. 5, 2017

(54) FUEL CELL VEHICLE

(71) Applicant: TOYOTA JIDOSHA KABUSHIKI KAISHA, Toyota-shi, Aichi-ken (JP)

(72) Inventors: Masahiko Nishikawa, Mishima (JP); Hiroaki Nishiumi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/432,300

(22) Filed: Feb. 14, 2017

(65) Prior Publication Data
US 2017/0232829 A1   Aug. 17, 2017

(30) Foreign Application Priority Data

Feb. 17, 2016   (JP) .................................. 2016-027710

(51) Int. Cl.
*B60K 1/04* (2006.01)
*B60L 11/18* (2006.01)
*H01M 8/2475* (2016.01)

(52) U.S. Cl.
CPC ............ *B60K 1/04* (2013.01); *B60L 11/1896* (2013.01); *H01M 8/2475* (2013.01); *B60K 2001/0411* (2013.01); *H01M 2250/20* (2013.01)

(58) Field of Classification Search
CPC .......................... B60L 11/1896; B60L 11/1898
See application file for complete search history.

(56) References Cited

U.S. PATENT DOCUMENTS

| 9,079,508 B2* | 7/2015 | Naito | B60K 1/04 |
| 2016/0207387 A1* | 7/2016 | Itoga | B60K 1/04 |

FOREIGN PATENT DOCUMENTS

| JP | 2013-112123 | 6/2013 |
| JP | 2014-101058 | 6/2014 |

* cited by examiner

*Primary Examiner* — John Walters
*Assistant Examiner* — James Triggs
(74) *Attorney, Agent, or Firm* — Finnegan, Henderson, Farabow, Garrett & Dunner, LLP

(57) ABSTRACT

A fuel cell vehicle comprises a fuel cell stack that is mounted in a housing box placed on a front or rear side of a passenger compartment. The fuel cell stack is housed in a stack casing, and the stack casing is mounted on a frame of the housing box via a stack mount. The stack mount includes: a stack-side bracket provided in the stack casing; a frame-side bracket provided in the frame; and a fixing member configured to fix the stack-side bracket and the frame-side bracket together. The stack mount has at least either one of: (a) a first structure in which a cutout portion is formed in the stack-side bracket on one side thereof which faces a proximal end portion, the proximal end portion being one of a front end portion and a rear end portion of the fuel cell vehicle which is closer to the housing box; or (b) a second structure in which a cutout portion is formed in the frame-side bracket on one side thereof which faces a distal end portion, the distal end portion being another one of the front end portion and the rear end portion of the fuel cell vehicle which is farther from the housing box.

3 Claims, 15 Drawing Sheets

FUEL CELL VEHICLE

CROSS REFERENCE TO RELATED APPLICATIONS

This application claims priority to Japanese Patent Application No. 2016-27710 filed on Feb. 17, 2016, the entire contents of which are incorporated by reference herein.

BACKGROUND

Field

The present invention relates to a fuel cell vehicle on which a fuel cell stack is mounted.

Related Art

JP2014-101058A describes a fuel cell vehicle structure in which a fuel cell stack is mounted via a mount mechanism. This mount mechanism includes a rear-side retaining part for fixing a rear side of the fuel cell stack to a vehicle frame, and a front-side retaining part which is fitted to a vehicle subframe constituting the vehicle frame to retain a front side of the fuel cell stack and which, when burdened with an external load, yielding a bending deformation of its shape and maintaining the retaining function for the front side of the fuel cell stack. When an external load is applied to the mount mechanism from the front side in a vehicle's lengthwise direction, the front-side retaining part is deformed in the vehicle's lengthwise direction while maintaining the retaining function for the front side of the fuel cell stack in the vehicle's lengthwise direction. Thus, when an external load is applied to the fuel cell vehicle from the front side in the vehicle's lengthwise direction, release of the fuel cell stack from the mount mechanism is suppressed as much as possible.

However, with the technique described in JP2014-101058A, for example, in an event that an external load is not applied to the mount mechanism but applied to the fuel cell stack or its housing (stack casing) mounted on the mount mechanism as in an under-ride collisions, an excessive external load is given to the fuel cell stack so that the fuel cell stack may be broken.

SUMMARY

The present invention, having been accomplished to solve at least part of the above-described problems, can be embodied in the following aspects.

(1) According to an aspect of the present invention, there is provided a fuel cell vehicle in which a fuel cell stack is mounted in a housing box provided on a front or rear side of a passenger compartment, wherein the fuel cell stack is housed in a stack casing, and the stack casing is mounted on a frame of the housing box via a stack mount. The stack mount includes: a stack-side bracket provided in the stack casing; a frame-side bracket provided in the frame; and a fixing member configured to fix the stack-side bracket and the frame-side bracket together. The stack mount has at least either one of: (a) a first structure in which a cutout portion is formed in the stack-side bracket on one side thereof which faces a proximal end portion, the proximal end portion being one of a front end portion and a rear end portion of the fuel cell vehicle which is closer to the housing box; or (b) a second structure in which a cutout portion is formed in the frame-side bracket on one side thereof which faces a distal end portion, the distal end portion being another one of the front end portion and the rear end portion of the fuel cell vehicle which is farther from the housing box.

According to the fuel cell vehicle in this aspect, even if a large load is applied to the stack casing from the proximal end portion, which is closer to the housing box, toward the distal end portion of the fuel cell vehicle (e.g., upon an under-ride collision), the stack-side bracket can be released from the frame-side bracket so that the fuel cell stack housed in the stack casing can be moved toward the distal end portion. As a result, such a likelihood can be suppressed that the fuel cell stack may be damaged due to an excessive load applied to the stack casing in a direction from the proximal end portion toward the distal end portion. On the other hand, if a relatively small load is applied to the stack casing from the distal end portion toward the proximal end portion, the stack-side bracket can be maintained non-released from the frame-side bracket so that the fuel cell stack can be maintained non-released from the frame of the housing box.

(2) In the above aspect, the stack mount may further include a rubber member inserted between the stack-side bracket and the frame-side bracket.

According to the fuel cell vehicle in this aspect, when such a small load as would not incur damage to the fuel cell stack is applied in a direction from the proximal end portion toward the distal end portion, the stack-side bracket is made unlikely to be released from the fixing member by friction between the rubber member and the stack-side bracket. As a result, the fuel cell stack housed in the stack casing can be made unlikely to be released from the state in which it is mounted on the frame of the housing box.

(3) According to an aspect of the present invention, there is provided a fuel cell vehicle in which a fuel cell stack is mounted in a housing box provided on a front or rear side of a passenger compartment, wherein the fuel cell stack is housed in a stack casing, and the stack casing is mounted on a frame of the housing box via a stack mount. The stack mount includes: a stack-side bracket provided in the stack casing; a frame-side bracket provided in the frame; an intermediate bracket having a first bracket portion fixed to the stack-side bracket and a second bracket portion fixed to the frame-side bracket to interconnect the stack-side bracket and the frame-side bracket; a first fixing member configured to fix the stack-side bracket and the first bracket portion together; and a second fixing member configured to fix the second bracket portion and the frame-side bracket together. The stack mount has at least one of: (a) a first structure in which a cutout portion is formed in the second bracket portion of the intermediate bracket on one side thereof which faces a proximal end portion, the proximal end portion being one of a front end portion and a rear end portion of the fuel cell vehicle which is closer to the housing box; or (b) a second structure in which a cutout portion is formed in the first bracket portion of the intermediate bracket on one side thereof which faces a distal end portion, the distal end portion being another one of the front end portion and the rear end portion of the fuel cell vehicle which is farther from the housing box.

According to the fuel cell vehicle in this aspect, even if a large load is applied to the stack casing in a direction from the proximal end portion, which is closer to the housing box, toward the distal end portion of the fuel cell vehicle (e.g., upon an under-ride collision), the stack-side bracket or both the stack-side bracket and the intermediate bracket can be released from the frame-side bracket so that the fuel cell stack housed in the stack casing can be moved toward the distal end portion. As a result, such a likelihood can be suppressed that the fuel cell stack may be damaged due to an excessive load applied to the stack casing in a direction from the proximal end portion toward the distal end portion. On the other hand, if a relatively small load is applied to the stack casing from the distal end portion toward the proximal end portion, the stack-side bracket can be maintained non-released from the frame-side bracket so that the fuel cell stack can be maintained non-released from the frame of the housing box.

DESCRIPTION OF THE EMBODIMENTS

A. First Embodiment

Figure 1:
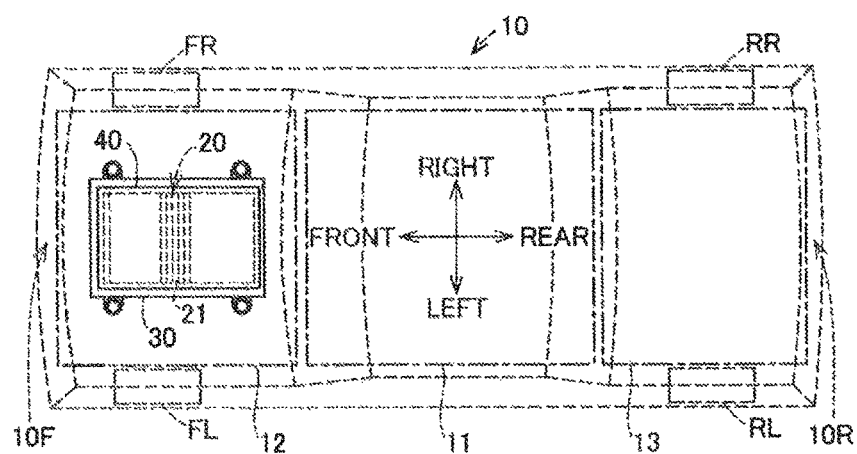
FIG. 1 is an explanatory view showing a fuel cell vehicle as a first embodiment of the present invention.

FIG. 1 is an explanatory view showing a fuel cell vehicle as a first embodiment of the present invention. The fuel cell vehicle 10 is an automobile equipped with wheels FR, FL, RR, and RL at four corners. Arrows of 'FRONT, REAR, LEFT, and RIGHT' in the figure indicate directions with reference to the fuel cell vehicle 10. Hereinafter, designations of front side, rear side, right side, and left side refer to directions indicated by the arrows of 'FRONT, REAR, LEFT, and RIGHT'. The fuel cell vehicle 10 has a central passenger compartment 11, a front box or front compartment 12 on the front side of the passenger compartment 11, and a rear box or rear compartment 13 on its rear side. Mounted in the front box 12 are a fuel cell stack 20 housed in a stack casing 30, and an FC controller housed in a controller casing 40, as well as unshown voltage conversion unit, fluid supply/discharge unit, and the like. The controller casing 40 is attached on the top of the stack casing 30. It is noted that the front box 12 having the fuel cell stack 20 mounted therein corresponds to a 'housing box'. Also, out of a front end portion 10F and a rear end portion 10R of the fuel cell vehicle 10, the front end portion 10F closer to the front box 12 corresponds to a 'proximal end portion', and the rear end portion 10R corresponds to a 'distal end portion'.

The fuel cell stack 20 is a multilayer stacked body in which a plurality of unit cells 21, for example, solid polymer type fuel cells, are stacked in layers. Each unit cell 21 generates electric power by using a fuel gas (e.g., hydrogen gas) supplied from a fuel gas tank (not shown) mounted on the fuel cell vehicle 10, and air supplied as an oxidizing gas from an air pump (not shown).

The fuel cell stack 20 is controlled for power generation by the FC controller housed in the controller casing 40. Electric power generated by the fuel cell stack 20 is delivered via a voltage conversion unit (not shown) to a drive motor (not shown) included in the fuel cell vehicle 10. By the drive motor, for example, the front-side wheels FR, FL are driven into rotation.

Figure 2A:
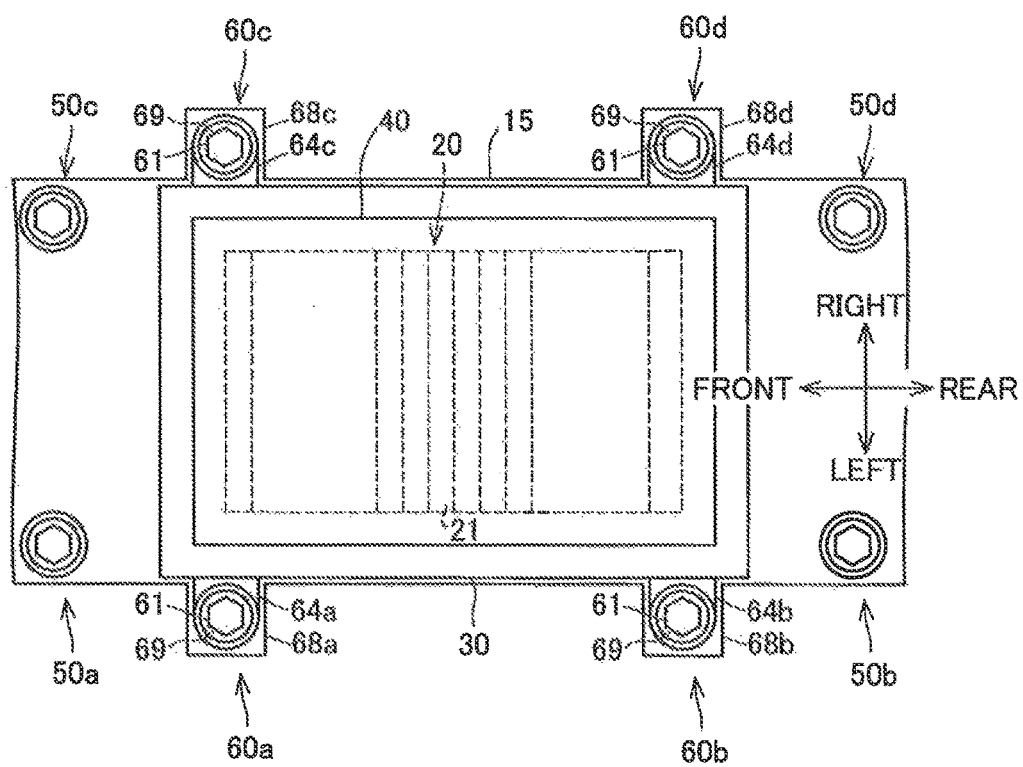
FIGS. 2A and 2B are explanatory views schematically showing a mounting state of a stack casing in a front box.
Figure 2B:
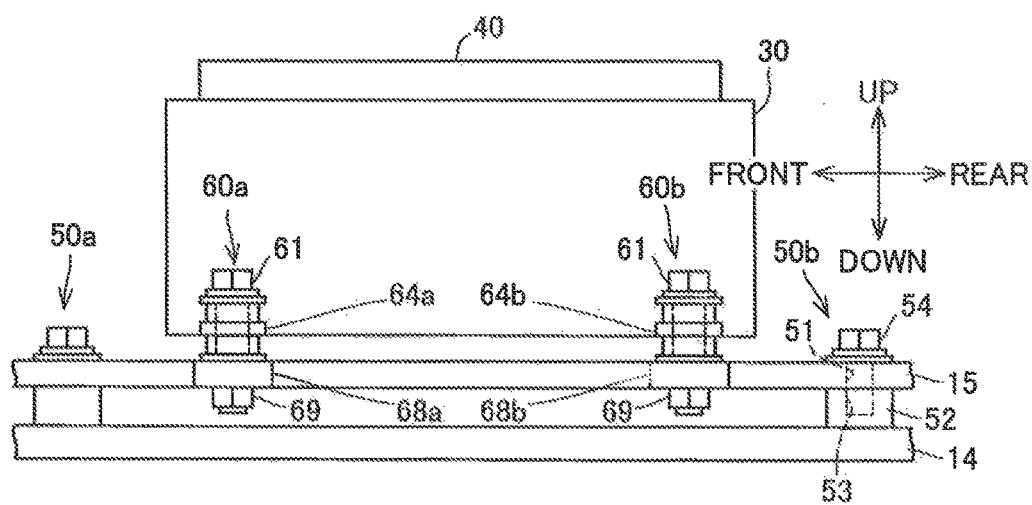

FIGS. 2A and 2B are explanatory views schematically showing a mounting state of the stack casing 30 in the front box 12. FIG. 2A is a plan view of the stack casing 30 as viewed from above, and FIG. 2B is a side view thereof.

The stack casing 30 is vertically positioned in such a way that the stacking direction of the plural unit cells 21 of the fuel cell stack 20 generally coincides with a front-rear direction or vehicle's lengthwise direction of the fuel cell vehicle 10. The stack casing 30 and the controller casing 40 are formed, for example, from metal (e.g., stainless steel or aluminum) or reinforced resin material (e.g., CFRP) for the sake of attaining rigidity.

As shown in FIG. 2B, the stack casing 30 is fixed on a stack frame 15. The fuel cell vehicle 10 has a structure in which a vehicle body (not shown) and a vehicle frame 14 are connected and tightened together, and the stack frame 15 is fixed to the vehicle frame 14 in the front box 12 (FIG. 1). The stack frame 15 and the vehicle frame 14 are fixed together by a plurality (four in this example) of frame mounts 50a to 50d. The stack casing 30 and the stack frame 15 are fixed together by a plurality (four in this example) of stack mounts 60a to 60d.

As to the frame mounts 50a to 50d, mount bolts 54 are inserted through hole portions 51 of the stack frame 15, respectively, and the mount bolts 54 are fixedly screwed to female-screwed hole portions 53 of ribs 52 of the vehicle frame 14, respectively, thereby fixing the stack frame 15 to the vehicle frame 14. The frame mounts may be omitted if the stack frame 15 is fixed to the ribs of the vehicle frame 14 by welding or the like.

As to the stack mounts 60a to 60d, stack-side brackets 64a to 64d of the stack casing 30 and frame-side brackets 68a to 68d of the stack frame 15 are connected and tightened together by mount bolts 61 and mount nuts 69, respectively, thereby fixing the stack casing 30 to the stack frame 15. As described later, the stack mounts 60a to 60d releasably fixes the stack casing 30 to the stack frame 15.

Figure 3A:
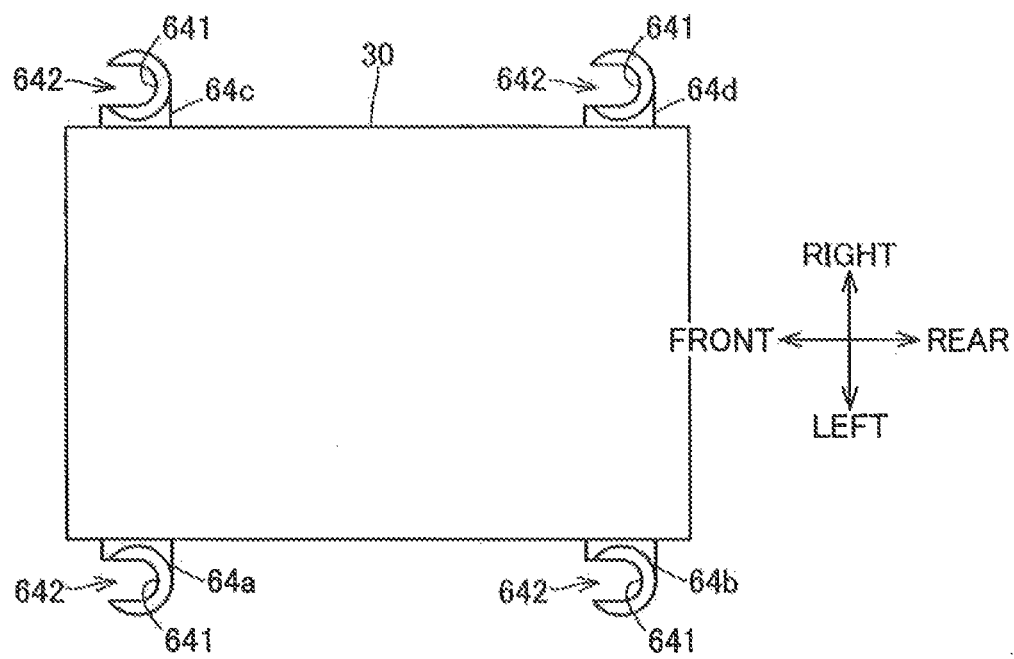
FIGS. 3A and 3B are explanatory views schematically showing stack-side brackets of the stack casing and frame-side brackets of a stack frame.
Figure 3B:
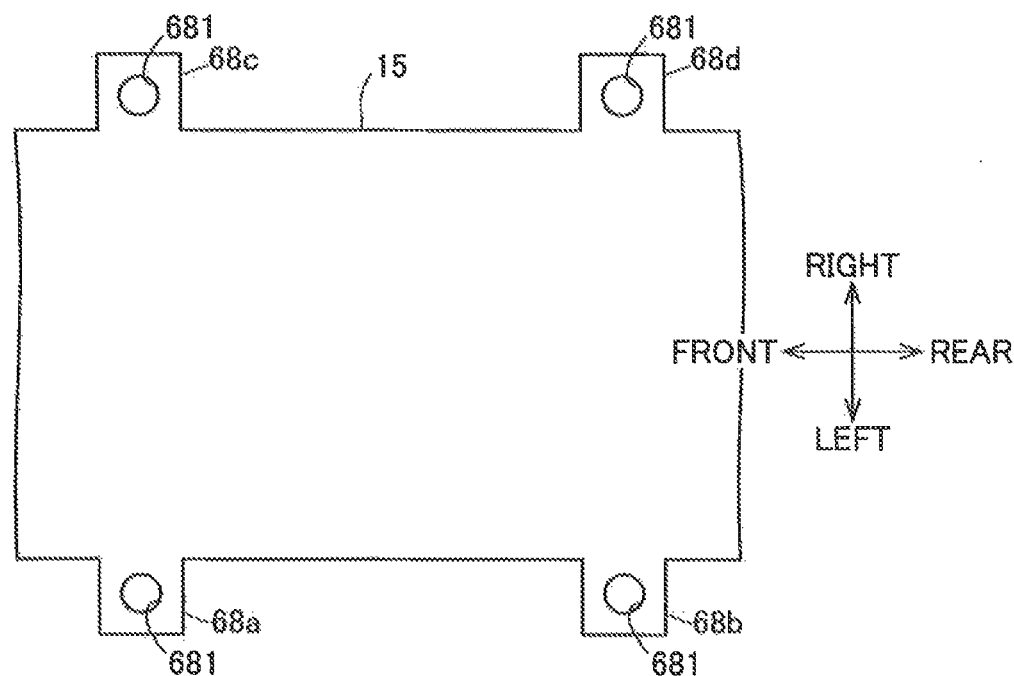

FIGS. 3A and 3B are explanatory views schematically showing the stack-side brackets 64a to 64d of the stack casing 30 and the frame-side brackets 68a to 68d of the stack frame 15. FIG. 3A is a plan view of the stack casing 30, and FIG. 3B is a plan view of the stack frame 15. As to the stack casing 30, as shown in FIG. 3A, the stack-side brackets 64a, 64b protruding leftward from a lower end of the stack casing 30 are provided at a front-side portion and a rear-side portion, respectively, on the left side of the stack casing 30. Similarly, the stack-side brackets 64c and 64d are provided on the right side of the stack casing 30. In the stack frame 15, as shown in FIG. 3B, the plural frame-side brackets 68a to 68d corresponding to the stack-side brackets 64a to 64d, respectively, are provided. Frame-side bracket holes 681 into which the mount bolts 61 are to be inserted are formed in the frame-side brackets 68a to 68d, respectively. Similarly, stack-side bracket holes 641 are formed also in the stack-side brackets 64a to 64d, respectively. However, slits 642 are formed in the stack-side bracket holes 641, respectively, so as to provide openings on the front side of the stack-side bracket holes 641. These slits 642 correspond to 'cutout portions'.

Figure 4:
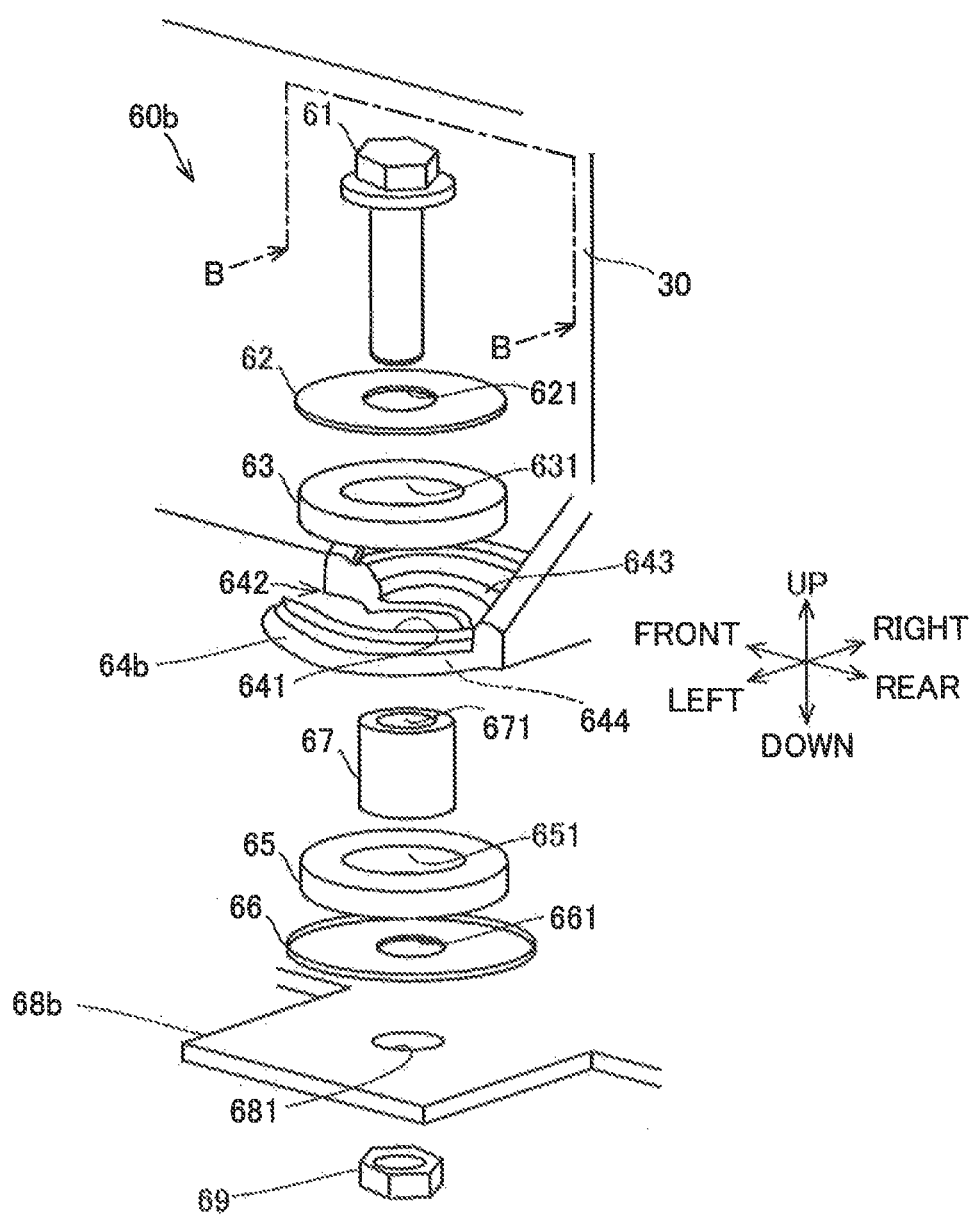
FIG. 4 is a perspective view showing a stack mount as it is exploded.

FIG. 4 is an exploded perspective view showing a stack mount 60b (FIG. 2B). The stack mount 60b includes an insulative rubber member 63 placed on a base portion 643 on the upper side of the stack-side bracket 64b, and a retainer 62 as a retaining member for retaining the rubber member 63 from upside. The stack mount 60b also includes a rubber member 65 as an insulative elastic member to be placed under a base portion 644 on the lower side of the stack-side bracket 64b, and a retainer 66 as a retaining member for retaining the rubber member 65 from downside. A sleeve 67 is inserted through a rubber hole 631 of the upper-side rubber member 63, a stack-side bracket hole 641 of the stack-side bracket 64b, and a rubber hole 651 of the lower-side rubber member 65. The mount bolt 61 is inserted sequentially through a retainer hole 621 of the upper-side retainer 62, then a sleeve hole 671 of the sleeve 67 and the lower-side retainer hole 661, into a frame-side bracket hole 681 of the frame-side bracket 68b. The end of the mount bolt 61 is fixedly screwed with the mount nut 69, thereby fixing the stack-side bracket 64b to the frame-side bracket 68b. The mount bolt 61 and the mount nut 69 correspond to 'fixing member(s)'. The rubber members 63 and 65, which sandwich the stack-side bracket 64b therebetween, ensure the insulation of the stack casing 30 and suppress its vibrations. Although illustration and description are omitted, the other stack mounts 60a, 60c, and 60d have the same structure as the stack mount 60b.

Figure 5:
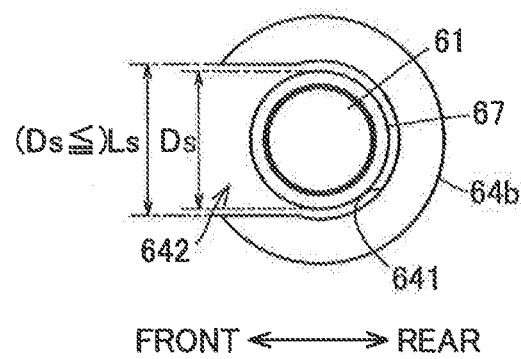
FIG. 5 is a plan view schematically showing a state of a stack-side bracket as viewed from above.

FIG. 5 is a plan view schematically showing the stack-side bracket 64b as viewed from above. In this example, the slit 642 of the stack-side bracket 64b is formed to have a width Ls equal to or more than a diameter Ds of the sleeve 67 such that the stack-side bracket 64b is movable or releasable backward of the mount bolt 61 inserted into the sleeve 67. Various modifications adoptable for the shape of the slit 642 will be described later.

Figure 6:
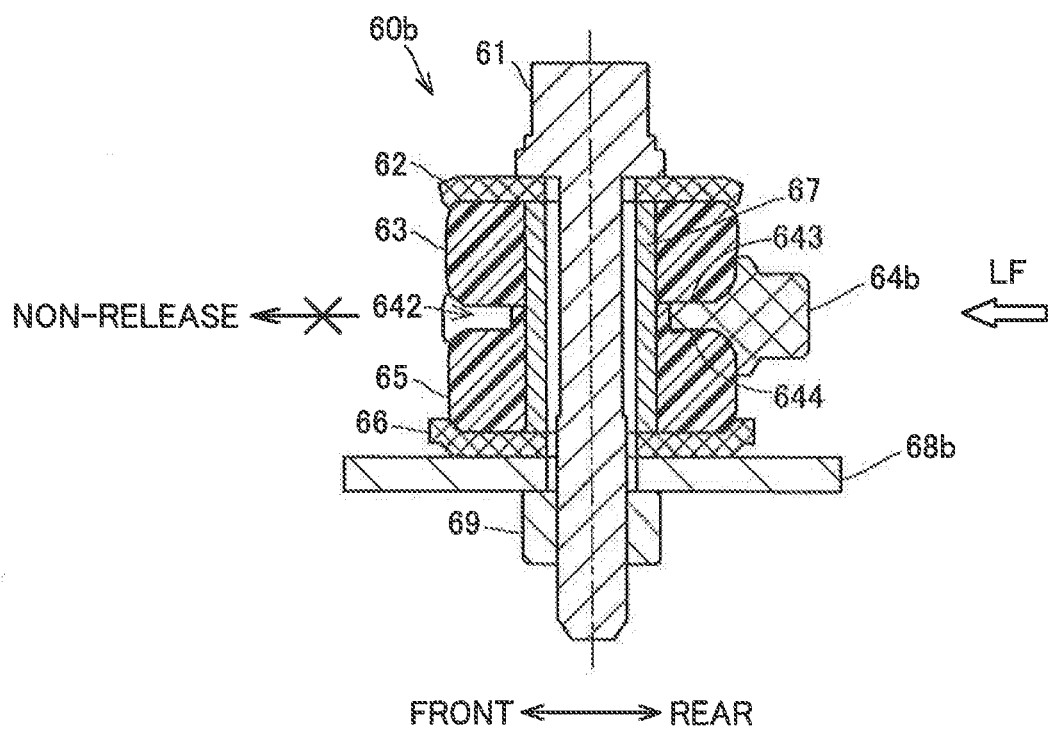
FIG. 6 is an explanatory view showing a state of the stack mount when a load directed from rear side to front side is applied to the stack casing.

FIG. 6 is an explanatory view showing a state of the stack mount 60b when a load directed from rear side toward front side is applied to the stack casing 30. FIG. 6 shows a B-B cross section of the stack mount 60b of FIG. 4 in a state that the stack-side bracket 64b and the frame-side bracket 68b are tightened and fixed together. When a forward load LF is applied to the stack casing 30 from rear side toward front side, the forward load LF acts in such a direction as to compel the stack casing 30 to move forward, resulting that the stack-side bracket 64b and the frame-side bracket 68b are maintained in the tightened and fixed state. Hereinbelow, the state that the stack-side bracket 64b and the frame-side bracket 68b are tightened and fixed together will be referred to also as a 'state that the stack mount 60b is tightened and fixed'. This is also applicable similarly to the other stack mounts 60a, 60c, and 60d. Accordingly, in this case, since the stack mounts 60a to 60d are maintained in the tightened and fixed state, the stack casing 30 is set fixed without being released from the stack frame 15.

Figure 7A:
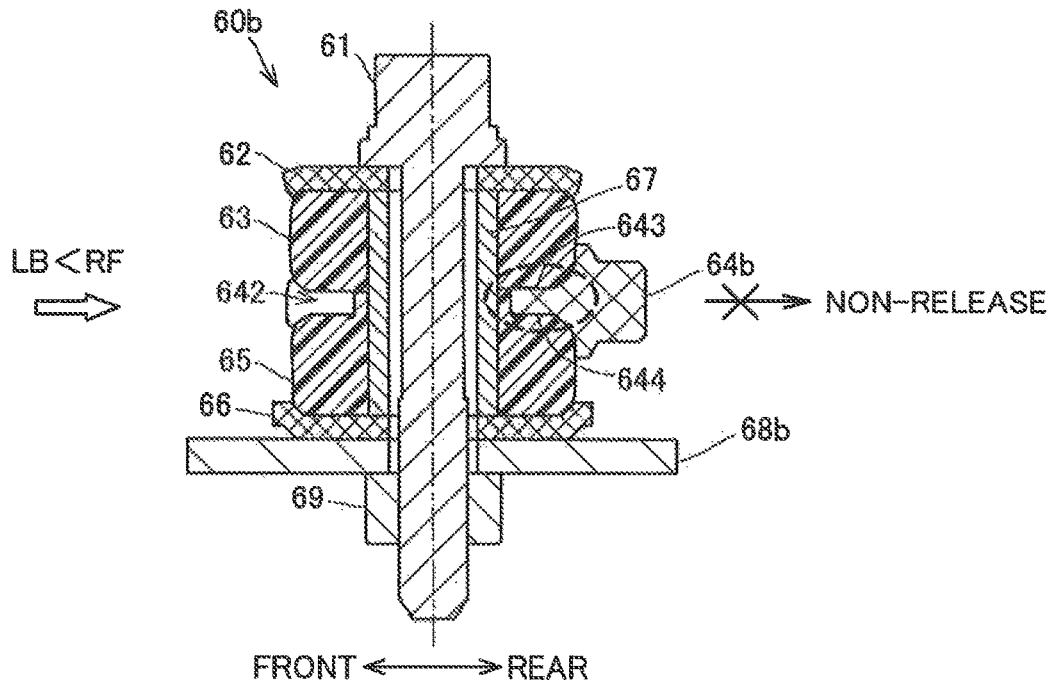
FIGS. 7A and 7B are explanatory views showing a state of the stack mount when a load directed from front side to rear side is applied to the stack casing.
Figure 7B:
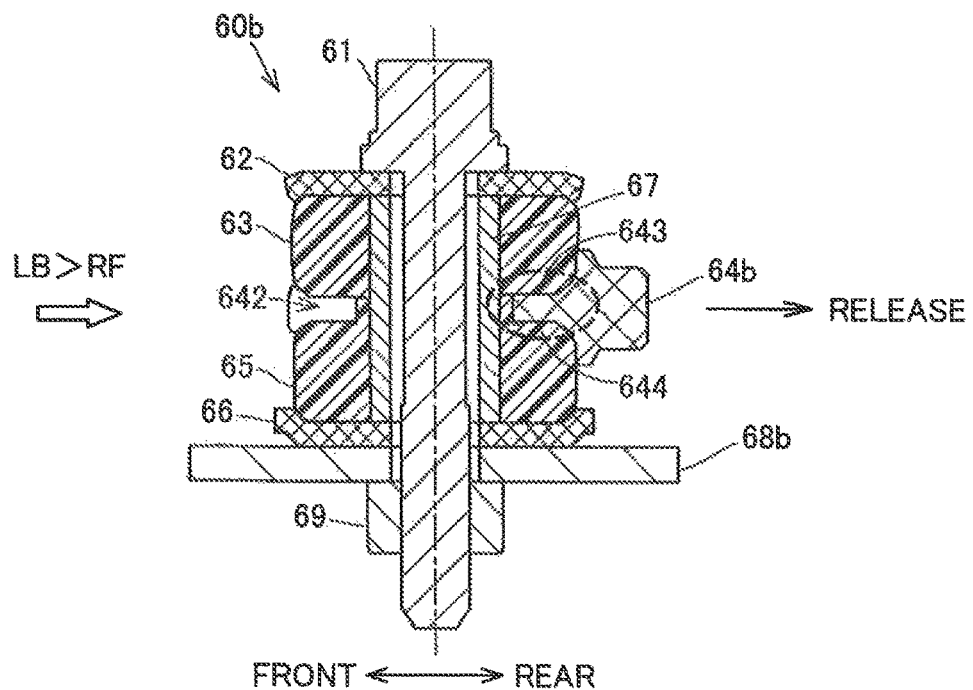

FIGS. 7A and 7B are explanatory views showing a state of the stack mount 60b when a load directed from front side toward rear side is applied to the stack casing 30. FIGS. 7A and 7B are shown in a cross section similar to that of FIG. 6. FIG. 7A shows a case in which a backward load LB directed from front side toward rear side is applied to the stack casing 30, where the backward load LB is smaller than a frictional resistance RF of the stack mount 60b that arises in the state that the stack mount 60b is tightened and fixed. The frictional resistance RF is a frictional force which, as indicated by an elliptical broken-line in the figure, acts between the upper-side rubber member 63 and the base portion 643 on the upside of the stack-side bracket 64b as well as between the base portion 644 on the downside of the stack-side bracket 64b and the lower-side rubber member 65. If the backward load LB is smaller than the frictional resistance RF, the state that the stack mount 60b is tightened and fixed is maintained. This is also applicable similarly to the other stack mounts 60a, 60c, and 60d. Accordingly, in this case, since the stack mounts 60a to 60d are maintained in the tightened and fixed state, the stack casing 30 is set fixed without being released from the stack frame 15.

FIG. 7B shows a case in which a backward load LB applied to the stack casing 30 is larger than the frictional resistance RF. If the backward load LB is larger than the frictional resistance RF, the stack-side bracket 64b is released backward from the mount bolt 61 via the slit 642. This is also applicable similarly to the other stack mounts 60a, 60c, and 60d. Accordingly, in this case, since the stack-side brackets 64a to 64d are released from the state that the stack mounts 60a to 60d are tightened and fixed, the stack casing 30 is also released from the stack frame 15.

As described above, in the first embodiment, since the stack casing 30 is releasably fixed to the stack frame 15 by the stack mounts 60a to 60d, such effects as will be described hereinbelow can be obtained.

Figure 8:
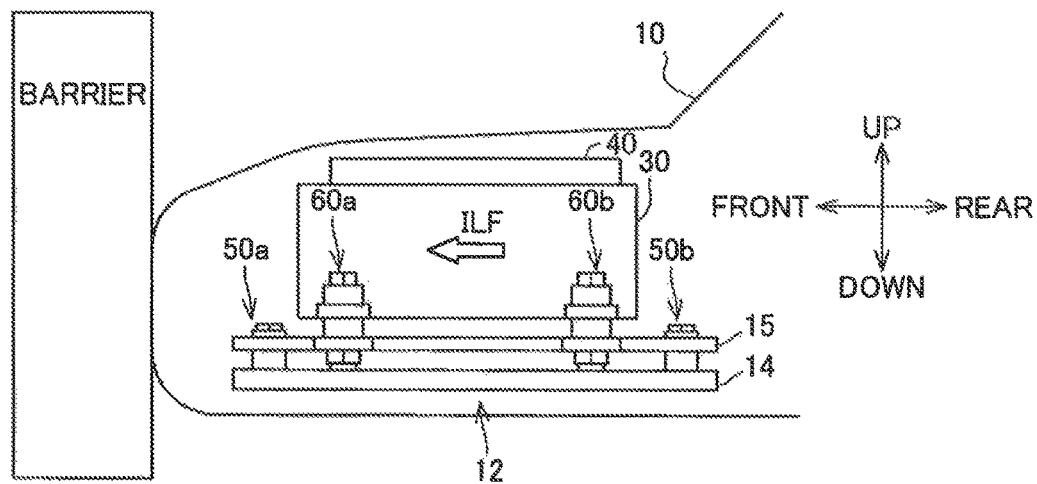
FIG. 8 is an explanatory view showing a state of the stack casing upon a head-on collision of the fuel cell vehicle.

FIG. 8 is an explanatory view showing a state of the stack casing 30 upon a head-on collision of the fuel cell vehicle 10. FIG. 8 shows a case, as an example, in which a front-side end portion (front-face end) of the fuel cell vehicle 10 comes into a head-on collision (hereinafter, referred to also as 'frontal collision') with a barrier. In the case of the frontal collision, the load applied to the stack casing 30 is a forward inertia load ILF going forward, and the resulting state is equivalent to that of the forward load LF described in FIG. 6. Accordingly, in this case, the fuel cell stack 20 housed in the stack casing 30 can be maintained in the fixed-to-vehicle state by the stack mounts 60a to 60d without being released from the stack frame 15.

Figure 9:
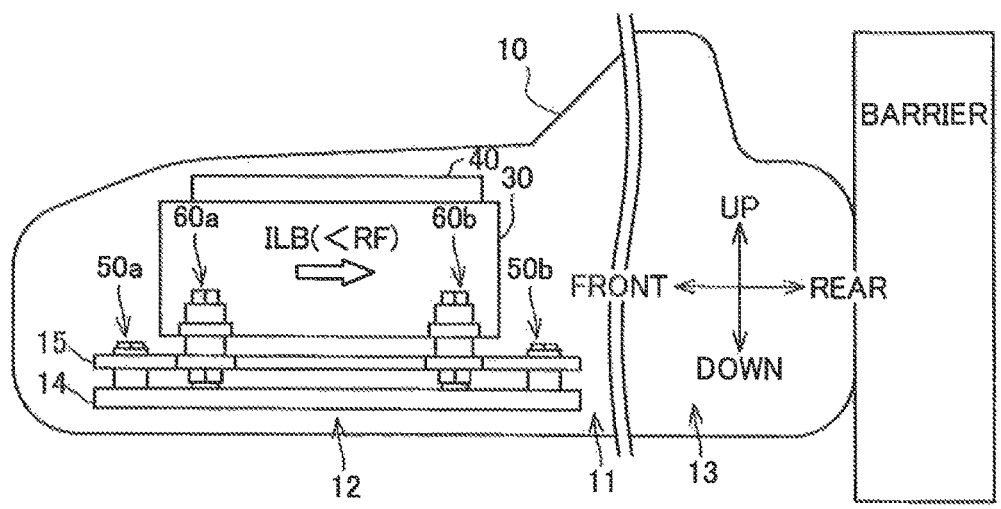
FIG. 9 is an explanatory view showing a state of the stack casing upon a rear-face collision of the fuel cell vehicle.

FIG. 9 is an explanatory view showing a state of the stack casing 30 upon a rear-face collision of the fuel cell vehicle 10. FIG. 9 shows a case, as an example, in which a rear-side end portion (rear-face end) of the fuel cell vehicle 10 comes into a rear-face collision (hereinafter, referred to also as 'rear collision') with a barrier. In the case of the rear collision, the load applied to the stack easing 30 is a backward inertia load ILB going backward. However, because the front box 12 having the stack casing 30 mounted therein is located forward of the rear box 13 and the vehicle compartment 11 and far from the rear-face end that is the place of rear-collision occurrence, the impact is absorbed midway in the rear-face end, the rear box 13 and the vehicle compartment 11 so as the backward inertia load ILB applied to the stack casing 30 becomes smaller, resulting in a state equivalent to that of FIG. 7A. Accordingly, in the case of the rear collision also, the fuel cell stack 20 housed in the stack casing 30 can be maintained in the fixed-to-vehicle state by the stack mounts 60a to 60d without being released from the stack frame 15, as in the case of the frontal collision.

Figure 10:
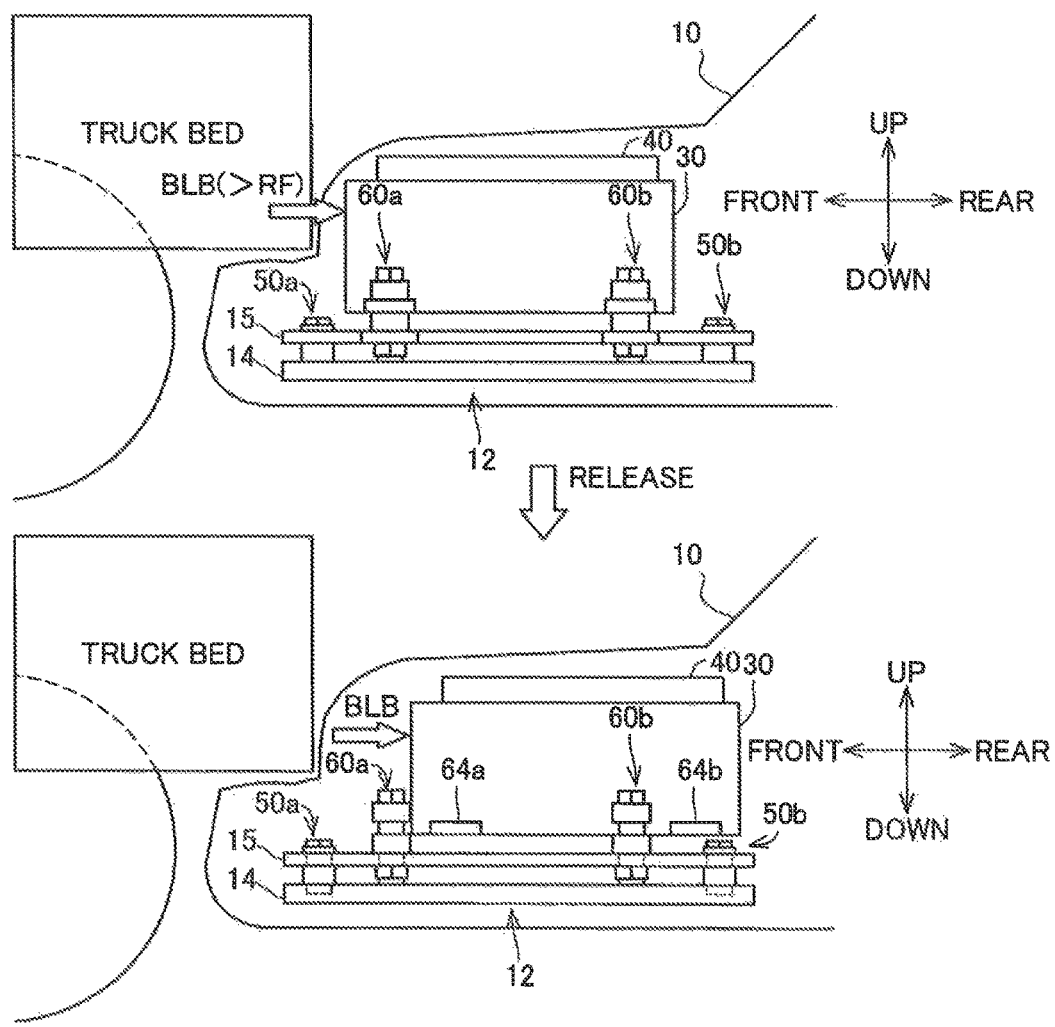
FIG. 10 is an explanatory view showing a state of the stack casing upon an under-ride collision of the fuel cell vehicle.

FIG. 10 is an explanatory view showing a state of the stack casing 30 upon an under-ride collision of the fuel cell vehicle 10. FIG. 10 shows an under-ride collision, as an example, in which the fuel cell vehicle 10 has collided with a truck vehicle in front such that the fuel cell vehicle 10 thrusts under the truck bed, interlocking together. In this case, the load applied to the stack casing 30 is a backward direct load BLB which is directed from the collision-occurring bed toward the fuel cell vehicle 10 so as to be applied directly to the stack casing 30. Because the backward direct load BLB is quite larger than the backward inertia load ILB in the case of the rear collision (FIG. 9), if the stack casing 30 is maintained as it is in the fixed state, it might cause the stack casing 30 or the fuel cell stack 20 to be damaged and broken. In the first embodiment, since the slits 642 are provided on the front side of the stack-side brackets 64a to 64d, if such a large backward direct load BLB is caused by an under-ride collision, the stack casing 30 will be released from the stack frame 15 so that damage or breakage of the fuel cell stack 20 is suppressed. The release load in this case is preferably set to a value smaller than the breaking load of the stack casing 30.

Figure 11:
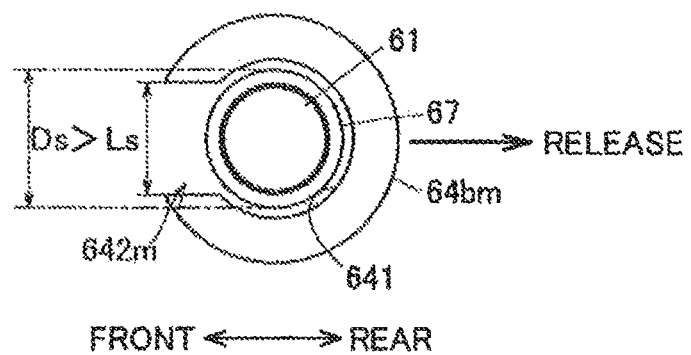
FIG. 11 is a plan view showing a stack-side bracket in a modification.

FIG. 11 is a plan view showing a stack-side bracket 64*bm* in a modification. The slit 642 of the stack-side bracket 64*b* in FIG. 5 is so set that its width Ls is equal to or larger than the diameter Ds of the sleeve 67. By contrast, a slit 642*m* of the stack-side bracket 64*bm* in the modification is shaped so that its width Ls is smaller than the diameter Ds of the sleeve 67 (referred to also as 'C-type slit'). In the case of this shape, release of the stack-side bracket 64*bm* from the mount bolt 61 involves a force for expanding the C-type slit 642*m* by the mount bolt 61. Accordingly, by adjusting the expanding force corresponding to the width Ls of the slit 642*m* in addition to the adjustment of the above-described frictional resistance RF, the release load may be set to a preferable value smaller than the breaking load of the stack casing 30. This modification is also applicable to the other stack-side brackets 64*a*, 64*c*, and 64*d*.

Figure 12A:
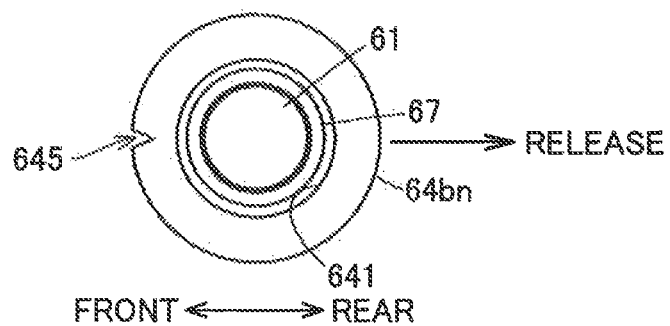
FIGS. 12A, 12B, and 12C are plan views showing stack-side brackets in still further modifications.
Figure 12B:
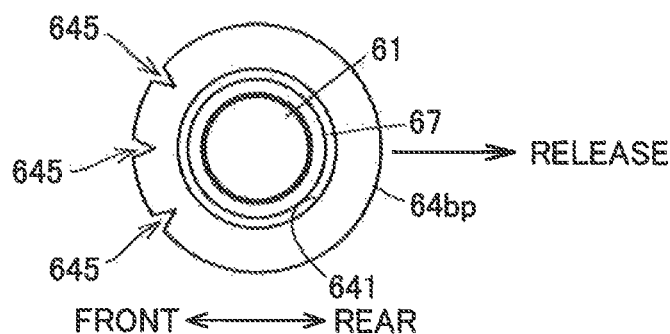
Figure 12C:
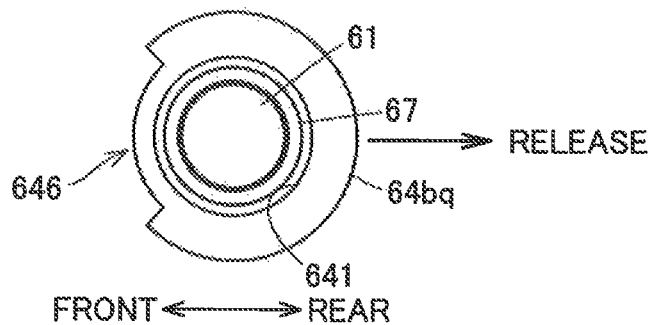

FIGS. 12A, 12B, and 12C are plan views showing stack-side brackets 64*bn*, 64*bp*, and 64*bq* in still further modifications. Whereas the stack-side brackets 64*a* to 64*d* in the foregoing embodiment have been described on a case, as an example, in which the slits 642 as cutout portions are provided, cutout portions of other shapes such as exemplified in these modifications may also be provided. The stack-side bracket 64*bn* in FIG. 12A has such a shape that a notch 645 is provided for breaking a front-side portion of the stack-side bracket 64*bn* to make a releasable portion. The stack-side bracket 64*bp* of FIG. 12B has such a shape that a plurality (three in this example) of notches 645 are provided. The stack-side bracket 64*bq* of FIG. 12C has an arc-shaped notch 646, but not a V-like shape such as that of the notch 645. The shape of the cutout portions is not limited to these ones, and various shapes may be used. By adjusting the bracket-breaking force by adjusting the shape, position and number of the cutout portions in addition to the adjustment of the frictional resistance RF, the release load can be set to a preferable value smaller than the breaking load of the stack casing 30. These modifications are also applicable to the other stack-side brackets 64*a*, 64*c*, and 64*d*. Also, whereas the examples of FIGS. 12A-12C are shown on cases where a notch or notches as cutout portions are provided on the outer circumference of the bracket, the cutout portions may also be provided on the inner circumference side of the bracket.

B. Second Embodiment

Figure 13A:
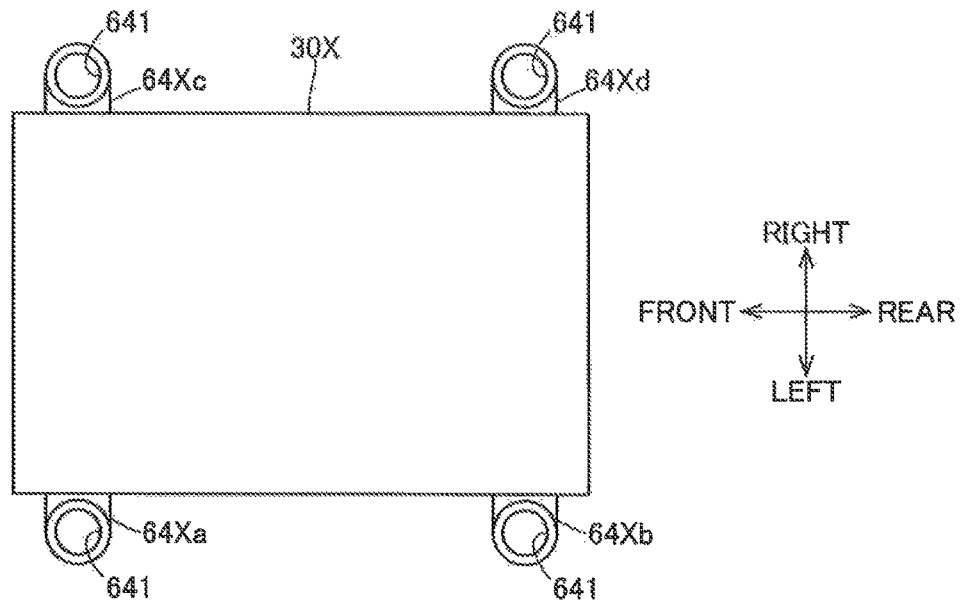
FIGS. 13A and 13B are plan views schematically showing stack-side brackets of a stack casing and frame-side brackets of a stack frame in a second embodiment.
Figure 13B:
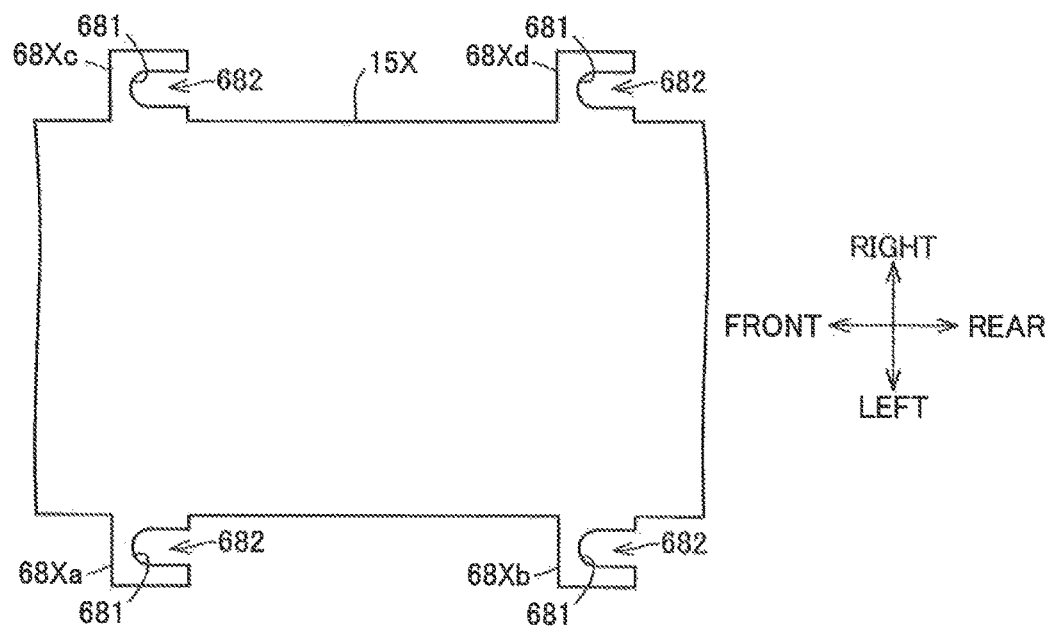

FIGS. 13A and 13B are plan views schematically showing stack-side brackets 64Xa to 64Xd of a stack casing 30X and frame-side brackets 68Xa to 68Xd of a stack frame 15X in a second embodiment; these figures corresponding to FIGS. 3A and 3B of the first embodiment. The second embodiment is the same as the first embodiment except that the stack-side brackets 64Xa to 64Xd of the stack casing 30X have no slits, and that the frame-side brackets 68Xa to 68Xd of the stack frame 15X are provided with slits 682 on the rear side.

Figure 14:
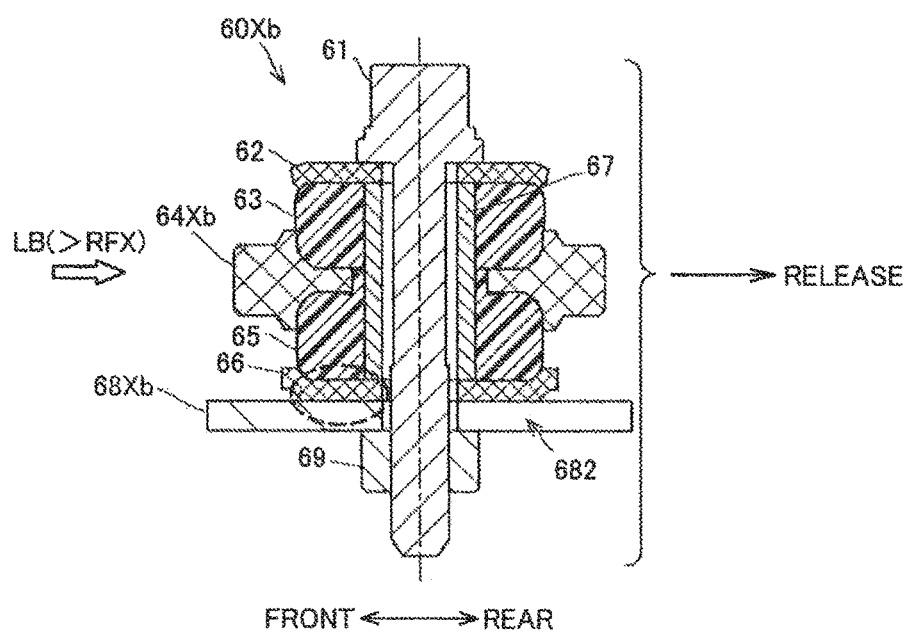
FIG. 14 is an explanatory view showing a state of the stack mount when a backward load applied to the stack casing is larger than a frictional resistance in the second embodiment.

FIG. 14 is an explanatory view showing a state of the stack mount 60Xb when a backward load LB applied to the stack casing 30X is larger than the frictional resistance RFX in the second embodiment. FIG. 14 is shown in a cross section similar to that of FIG. 7B. If the backward load LB applied to the stack casing 30X is larger than the frictional resistance RFX, the stack mount 60Xb except the frame-side bracket 68Xb is released backward via the slit 682 of the frame-side bracket 68Xb. The frictional resistance RFX acts between the retainer 66 and the frame-side bracket 68Xb as indicated by an elliptical broken line. This frictional force is set in correspondence to a force (referred to also as 'axial force') generated from the tightening load by the mount bolt 61 and the mount nut 69. This is also applicable to the other stack mounts. Accordingly, in the case of the under-ride collision shown in FIG. 10, the stack casing 30X can be released from the stack frame 15X so that damage or breakage of the fuel cell stack 20 can be suppressed.

The various modifications described in FIGS. 11 and 12A-12C may be applied also to the cutout portions formed with the slits 682 of the frame-side brackets 68Xa to 68Xd.

C. Third Embodiment

Figure 15A:
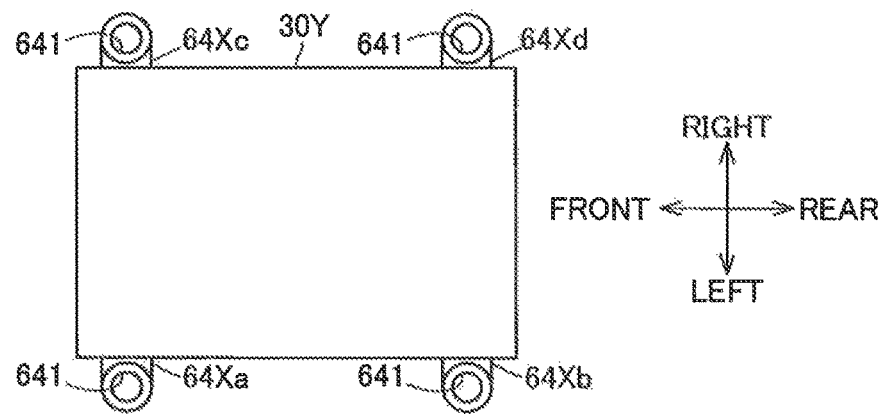
FIGS. 15A, 15B, and 15C are plan views schematically showing stack-side brackets of a stack casing, frame-side brackets of a stack frame, and intermediate brackets in a third embodiment.
Figure 15B:
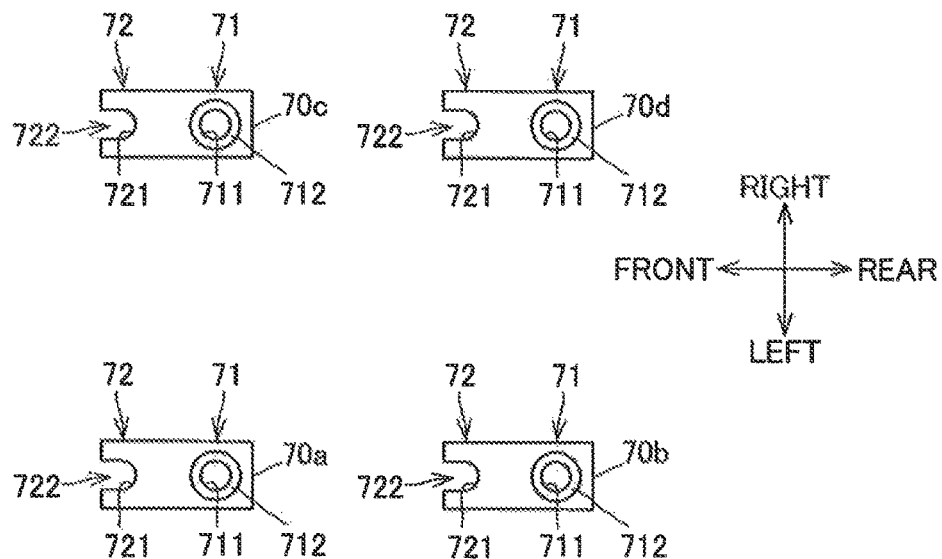
Figure 15C:
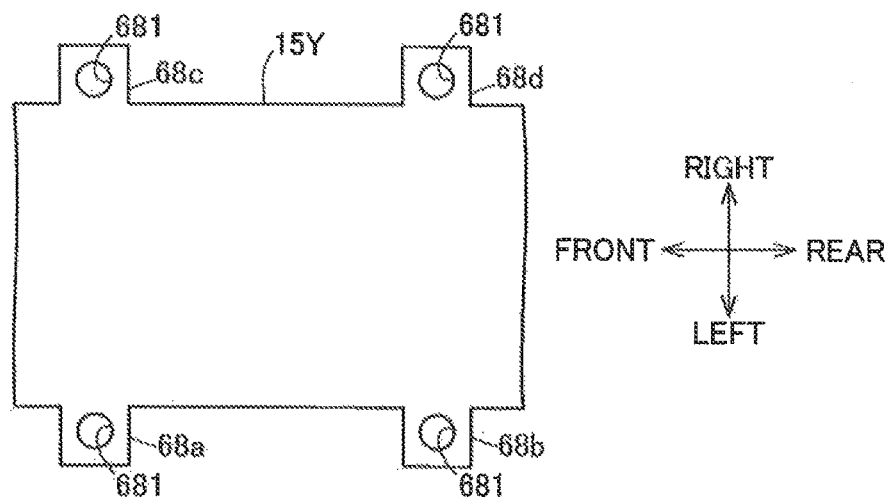

FIGS. 15A, 15B, and 15C are plan views schematically showing stack-side brackets 64Xa to 64Xd of a stack casing 30Y, frame-side brackets 68*a* to 68*d* of a stack frame 15Y, and intermediate brackets 70*a* to 70*d* in a third embodiment. FIG. 15A is a plan view of the stack casing 30Y, FIG. 15B is a plan view of the intermediate brackets 70*a* to 70*d*, and FIG. 15C is a plan view of the stack frame 15Y. The third embodiment is the same as the first and second embodiments in terms of the structure of the stack mounts that releasably fix the stack casing 30Y to the stack frame 15Y, except for the stack-side brackets 64Xa to 64Xd of the stack casing 30Y, the frame-side brackets 68*a* to 68*d* of the stack frame 15Y, and the intermediate brackets 70*a* to 70*d*.

The stack casing 30Y includes the stack-side brackets 64Xa to 64Xd having no slits such as those of the second embodiment (FIG. 13A). The stack frame 15Y includes the frame-side brackets 68*a* to 68*d* having no slits such as those of the first embodiment (FIG. 3B).

The intermediate brackets 70*a* to 70*d* respectively include first bracket portions 71 to be tightened to the stack-side brackets 64Xa to 64Xd, and second bracket portions 72 to be tightened to the frame-side brackets 68a to 68d. Each first bracket portion 71 has a first intermediate bracket hole 711 into which a first mount bolt 61 (see FIG. 4) is to be inserted, and a retaining portion 712 (corresponding to the retainer 66 as a retaining member) for retaining the rubber member 65 placed under the stack-side bracket 64Xa to 64Xd (see FIG. 4). Each second bracket portion 72 has a second intermediate bracket hole 721 into which a second mount bolt for fastening and fixing to the frame-side brackets 68a to 68b is to be inserted. The second intermediate bracket hole 721 has a slit 722 so formed as to provide an opening on the front side. This slit 722 corresponds to the 'cutout portion'.

The stack-side brackets 64Xa to 64Xd, and the first bracket portions 71 of the intermediate brackets 70a to 70d are tightened and fixed by the first mount bolts 61 and the first mount nuts 69 as in the case of the stack-side brackets 64a to 64d and the frame-side brackets 68a to 68d of the first embodiment (see FIG. 4). The second bracket portions 72 of the intermediate brackets 70a to 70d and the frame-side brackets 68a to 68d are releasably tightened and fixed by second mount bolts 74 and second mount nuts 75 (see later-described FIG. 16). The first mount bolts 61 and the first mount nuts 69 correspond to the 'first fixing member (s)', and the second mount bolts 74 and the second mount nuts 75 correspond to the 'second fixing member(s)'.

Figure 16:
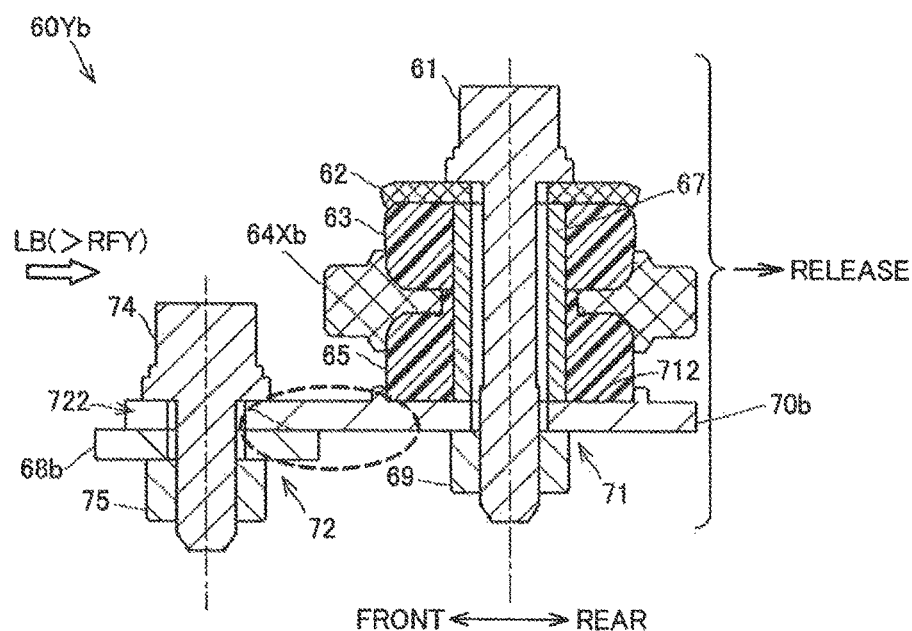
FIG. 16 is an explanatory view showing a state of a stack mount when a backward load applied to the stack casing is larger than a frictional resistance in the third embodiment.

FIG. 16 is an explanatory view showing a state of a stack mount 60Yb when a backward load LB applied to the stack casing 30Y is larger than the frictional resistance RFY in the third embodiment. FIG. 16 is shown in a cross section similar to that of FIG. 7B. If the backward load LB applied to the stack casing 30Y is larger than the frictional resistance RFY, the stack mount 60Yb except the frame-side bracket 68b tightened by the second mount bolt 74 and the second mount nut 75 is released backward via the slit 722 of the intermediate bracket 70b. The frictional resistance RFY acts between the second bracket portion 72 of the intermediate bracket 70b and the frame-side bracket 68b, as indicated by an elliptical broken-line. This frictional force is set in correspondence to a force (axial force) generated from the tightening load by the second mount bolt 74 and the second mount nut 75. This is also applicable to the other stack mounts. As a result, in the case of the under-ride collision shown in FIG. 10, the stack easing 30Y can be released from the stack frame 15Y so that damage or breakage of the fuel cell stack 20 can be suppressed.

The modifications described in FIGS. 11 and 12A-12C can be applied also to the cutout portions formed as the slits 722 of the second bracket portions 72 of the intermediate brackets 70a to 70d.

D. Fourth Embodiment

Figure 17A:
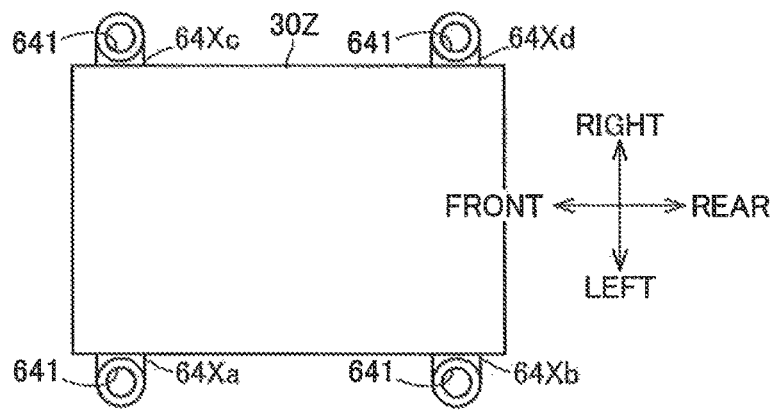
FIGS. 17A, 17B, and 17C are plan views schematically showing stack-side brackets of a stack casing, frame-side brackets of a stack frame, and intermediate brackets in a fourth embodiment.
Figure 17B:
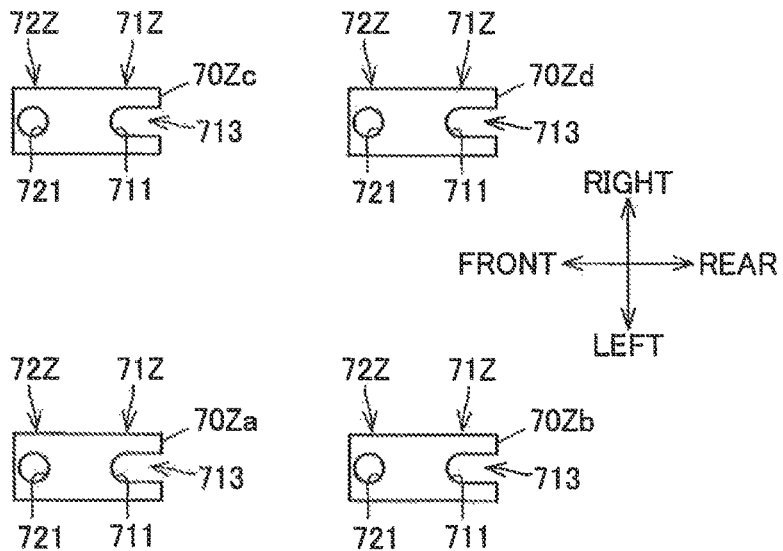
Figure 17C:
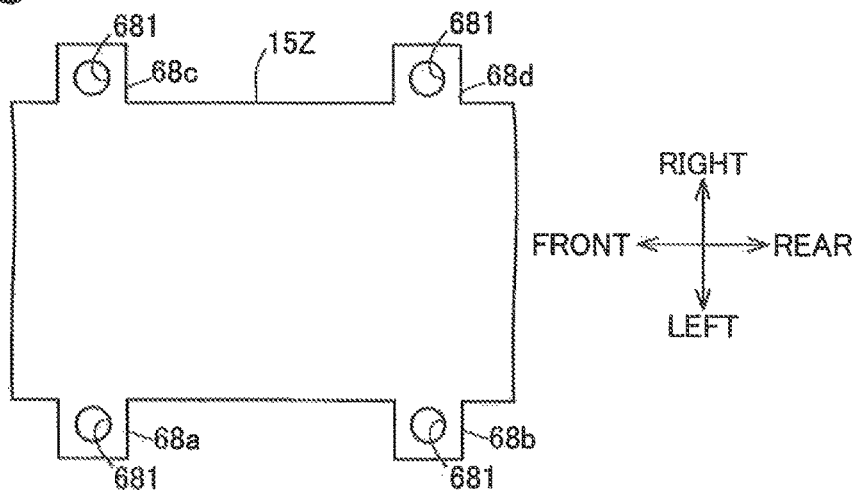

FIGS. 17A, 17B, and 17C are plan views schematically showing stack-side brackets 64Xa to 64Xd of a stack casing 30Z, frame-side brackets 68a to 68d of a stack frame 15Z, and intermediate brackets 70Za to 70Zd in a fourth. embodiment; the figures correspond to FIGS. 15A-15C of the third embodiment. The fourth embodiment is the same as the third embodiment except that the second bracket portions 72Z of the intermediate brackets 70Za to 70Zd have no slits, that the first bracket portions 71Z of the intermediate brackets 70Za to 70Zd are provided with slits 713, and that a retainer 66 as a retaining member is used instead of the retaining portion 712 (see FIGS. 4 and 14). In the case of this constitution, the frictional resistance that determines the release load is a frictional force between the first bracket portions 71Z of the intermediate brackets 70Za to 70Zd and the retainer 66.

In the fourth embodiment also, although not shown, if the backward load applied to the stack casing 30Z is larger than the frictional resistance, the stack mount except the frame-side brackets 68a to 68d and the intermediate brackets 70Za to 70Zd is released backward via the slits 713 of the intermediate brackets 70Za to 70Zd. As a result, the stack casing 30Z can be released from the stack frame 15Z so that damage or breakage of the fuel cell stack 20 can be suppressed, as in the third embodiment.

E. Modifications (1) in the first, second and fourth embodiments, their component members include the rubber members 63 and 65 for sandwiching the stack-side brackets 64a to 64d, 64Xa to 64Xd and the retainers 62 and 66 as retaining members for retaining the rubber members 63 and 65. Instead, yet either one, or both, of the upper-side rubber member 63 and retainer 62, or the lower-side rubber member 65 and retainer 66, may be omitted. Also in the third embodiment, its component members include the rubber members 63 and 65 for sandwiching the stack-side brackets 64Xa to 64Xd and the retainer 62 and retaining portion 712 as retaining members for retaining the rubber members. Instead, either one, or both, of the upper-side rubber member 63 and retainer 62, or the lower-side rubber member 65 and retaining portion 712, may be omitted. Furthermore, in the third embodiment, the structure may be made such that the rubber member and the retaining member for retaining the rubber member are provided on either one, or both, of the upper side or the lower side of the second bracket portions 72 of the intermediate brackets 70a to 70d, whereby the release load is set depending on the frictional resistance between the rubber member and the second bracket portions 72.

(2) In the foregoing embodiments, the stack mounts are provided four in number. However, the number of the stack mounts is not limited to four and may be, for example, two, three, five or other numbers.

(3) In the foregoing embodiments, the stack casing 30, 30X, 30Y, or 30Z is mounted on the front box or front compartment 12 serving as a housing box. Instead, the stack casing may be mounted on the rear box or rear compartment 13. In this case, the cutout portions provided in the stack-side brackets will be made not on the front side as described in the first embodiment (FIGS. 3A and 3B) but on the rear side, while the cutout portions provided in the frame-side brackets will be made not on the rear side as described in the second embodiment (FIGS. 13A and 13B) but on the front side. Further, the cutout portions provided at the second bracket portions of the intermediate brackets will be made not on the front side as described in the third embodiment (FIGS. 15A-15C) but on the rear side, while the cutout portions provided at the first bracket portions of the intermediate brackets will be made not on the rear side as described in the fourth embodiment (FIG. 17) but on the front side. In other words, the cutout portions when provided in the stack-side brackets are formed on that side of the stack-side brackets which faces the proximal end portion, out of the front end portion and the rear end portion of the fuel cell vehicle, closer to the housing box. On the other hand, the cutout portions when provided in the frame-side brackets are formed on that side of the frame-side brackets which faces the distal end portion, out of the front end portion and the rear end portion of the fuel cell vehicle, farther from the housing box. The cutout portions described above may be provided in both the stack-side brackets and the frame-side brackets. Further, the cutout portions when provided at the second bracket portions of the intermediate brackets are formed on that side of the second bracket portions which faces the proximal end portion, out of the front end portion and the rear end portion of the fuel cell vehicle, closer to the housing box. On the other hand, the cutout, portions when provided at the first bracket portions of the intermediate brackets are formed on that side of the first bracket portions which faces the distal end portion, out of the front end portion and the rear end portion of the fuel cell vehicle, farther from the housing box. The cutout portions described above may be provided at both the first bracket portions and the second bracket portions.

(4) The foregoing embodiments have been described on a case, as an example, in which the fuel cell stack is housed in the stack casing in such a way that the stacking direction of unit cells is directed along the front-rear direction (vehicle's lengthwise direction) of the fuel cell vehicle. However, the fuel cell stack may also be housed in the stack casing in such a way that the stacking direction of unit cells is directed along the left-right direction (vehicle's widthwise direction) of the fuel cell vehicle.

(5) In the foregoing embodiments, a solid polymer electrolyte fuel cell is used as the fuel cell. Otherwise, various fuel cells such as phosphoric acid fuel cells, molten carbonate fuel cells, and solid oxide fuel cells may also be used.

The invention is not limited to the above-described embodiments and modifications, and may be implemented in various ways within a scope that does not depart from its gist. For example, technical features in the embodiments and modifications corresponding to technical features in the individual modes described in the section of SUMMARY may be interchanged or combined in various ways as required in order to solve part or entirety of the above-described problems or to achieve part or entirety of the above-described advantageous effects. Furthermore, component elements other than elements described in the independent claims out of the component elements in the above-described embodiments and modifications are additional elements and therefore may be omitted as required.

What is claimed:

1. A fuel cell vehicle in which a fuel cell stack is mounted in a housing box provided on a front or rear side of a passenger compartment, wherein
   the fuel cell stack is housed in a stack casing, and
   the stack casing is mounted on a frame of the housing box via a stack mount,
   wherein the stack mount includes:
      a stack-side bracket provided in the stack casing;
      a frame-side bracket provided in the frame; and
      a fixing member configured to fix the stack-side bracket and the frame-side bracket together,
   wherein the stack mount has at least either one of:
      (a) a first structure in which a cutout portion is formed in the stack-side bracket on one side thereof which faces a proximal end portion, the proximal end portion being one of a front end portion and a rear end portion of the fuel cell vehicle which is closer to the housing box; or
      (b) a second structure in which a cutout portion is formed in the frame-side bracket on one side thereof which faces a distal end portion, the distal end portion being another one of the front end portion and the rear end portion of the fuel cell vehicle which is farther from the housing box.

2. The fuel cell vehicle in accordance with claim 1, wherein
   the stack mount further includes a rubber member inserted between the stack-side bracket and the frame-side bracket.

3. A fuel cell vehicle in which a fuel cell stack is mounted in a housing box provided on a front or rear side of a passenger compartment, wherein
   the fuel cell stack is housed in a stack casing, and
   the stack casing is mounted on a frame of the housing box via a stack mount,
   wherein the stack mount includes:
      a stack-side bracket provided in the stack casing;
      a frame-side bracket provided in the frame;
      an intermediate bracket having a first bracket portion fixed to the stack-side bracket and a second bracket portion fixed to the frame-side bracket to interconnect the stack-side bracket and the frame-side bracket;
      a first fixing member configured to fix the stack-side bracket and the first bracket portion together; and
      a second fixing member configured to fix the second bracket portion and the frame-side bracket together,
   wherein the stack mount has at least either one of:
      (a) a first structure in which a cutout portion is formed in the second bracket portion of the intermediate bracket on one side thereof which faces a proximal end portion, the proximal end portion being one of a front end portion and a rear end portion of the fuel cell vehicle which is closer to the housing box; or
      (b) a second structure in which a cutout portion is formed in the first bracket portion of the intermediate bracket on one side thereof which faces a distal end portion, the distal end portion being another one of the front end portion and the rear end portion of the fuel cell vehicle which is farther from the housing box.

* * * * *